United States Patent [19]

Miyazaki et al.

[11] Patent Number: 5,491,175
[45] Date of Patent: Feb. 13, 1996

[54] POLYURETHANE FOAM MOLDING

[75] Inventors: Yoshiaki Miyazaki, Minamitsuru; Kazuo Mizumura, Kawasaki, both of Japan

[73] Assignees: The Dow Chemical Company, Midland, Mich.; Dow Mitsubishi Kasei Ltd., Tokyo, Japan

[21] Appl. No.: 36,747

[22] Filed: Mar. 25, 1993

[30] Foreign Application Priority Data

Apr. 10, 1992 [JP] Japan ..................... 4-116645
Apr. 10, 1992 [JP] Japan ..................... 4-116654

[51] Int. Cl.$^6$ ..................... C08G 18/10
[52] U.S. Cl. ..................... 521/137; 521/159; 521/170; 521/174
[58] Field of Search ..................... 521/137, 159, 521/170, 173, 174

[56] References Cited

U.S. PATENT DOCUMENTS

| | | | |
|---|---|---|---|
| 4,065,410 | 12/1977 | Schäfer et al. | 252/182 |
| 4,374,210 | 2/1983 | Ewen et al. | 521/159 |
| 4,532,316 | 7/1985 | Hehn | 528/66 |
| 4,739,027 | 4/1988 | Mendelsohn et al. | 528/60 |
| 5,071,881 | 12/1991 | Parfondry et al. | |
| 5,141,684 | 8/1992 | Yoshimura et al. | |
| 5,246,947 | 9/1993 | Mussini | 521/159 |
| 5,246,977 | 9/1993 | Mussini | 521/159 |

*Primary Examiner*—Nathan M. Nutter
*Assistant Examiner*—John M. Cooney, Jr.

[57] ABSTRACT

This invention relates to polyurethane foam moldings prepared by reacting a specific polyisocyanate with a polyol in the presence of water as the primary blowing agent, wherein the polyisocyanate comprises a specific polyisocyanate mixture of a NCO-terminated prepolymer prepared employing poly(oxytetramethylene)glycol ("PTMG") with polymethylene polyphenyl polyisocyanate ("Polymeric MDI"), or a specific NCO-terminated prepolymer prepared from the reaction of an organic polyisocyanate containing Polymeric MDI as an essential component with PTMG. The polyurethane foam moldings have excellent abrasion resistance and can be useful for automotive steering wheels, headrests, armrests and the like.

10 Claims, No Drawings

POLYURETHANE FOAM MOLDING

BACKGROUND OF THE INVENTION

The present invention relates to polyurethane foam moldings having excellent abrasion resistance useful for automotive material for steering wheels, headrests and armrests, material for furniture and the like.

Integral skin polyurethane foams having fine pore skin are well-known to the public and are widely utilized as automotive material for steering wheels, headrests and armrests, and material for furniture and the like in various fields. The formation of the skin layer in the integral skin foams is based on the function of a blowing agent such as chlorofluorocarbon ("CFC") in the exothermic reaction of a polyisocyanate with a polyol. The use of a physical blowing agent such as CFC provides to the foams excellent skin properties which are required for the stated products. On the contrary, the use of a chemical blowing agent such as water does not usually provide excellent skin properties to the foams.

Some approaches to provide excellent skin properties to polyurethane foam moldings have included, for example, those described in Japanese Kokai Patent No. H03-24108, in which a specific catalyst mixture comprising a urethane catalyst and a carbodiimide catalyst is employed to provide low core density in the presence of a non-reactive physical blowing agent, and Japanese Kokai Patent No. H03-33120, in which a specific catalyst mixture is employed in the presence of water as the primary blowing agent. The technology disclosed in the latter patent may be especially useful as an alternative technology to a CFC based blowing agent under the Freon Regulation.

Since several years ago, it has been pointed out that CFC destroys the ozone layer of the Earth, and consequently, the use of CFC is globally expected to be restricted or abolished in various industrial fields in present and future. In such situation, some approaches to employ water as the primary blowing agent have been tried. However, in such prior art, there is a technical problem that polyurethane foams prepared employing water as a sole blowing agent are not better in skin properties and abrasion resistance than foams prepared employing CFC as a blowing agent.

SUMMARY OF THE INVENTION

The purpose of the present invention is to provide polyurethane foam moldings having excellent abrasion resistance. The inventors discovered that the stated purpose of the invention can effectively be achieved by employing a specific polyisocyanate in the presence of water as the primary sole blowing agent. The present invention provides polyurethane foam moldings by reacting a polyisocyanate with a polyol in the presence of water as the primary blowing agent, wherein the polyisocyanate comprises a mixture of a NCO-terminated prepolymer prepared from the reaction of an organic polyisocyanate with poly(oxytetramethylene)glycol ("PTMG"), and polymethylene polyphenyl polyisocyanate ("Polymeric MDI"). The present invention also provides polyurethane foam moldings prepared reacting a polyisocyanate with a polyol in the presence of water as the primary blowing agent, wherein the polyisocyanate comprises a NCO-terminated prepolymer prepared from the reaction of an organic polyisocyanate containing a Polymeric-MDI as an essential component with PTMG.

DETAILED DESCRIPTION OF THE INVENTION

Suitable polyisocyanates useful in the present invention include, for example, a mixture of a NCO-terminated prepolymer ("PTMG based prepolymer") prepared from the reaction of an organic polyisocyanate with poly(oxytetramethylene)glycol ("PTMG"), or a NCO-terminated prepolymer prepared from the reaction of an organic polyisocyanate containing polymethylene polyphenyl polyisocyanate ("Polymeric MDI") as an essential component with PTMG.

Suitable organic polyisocyanates useful in the present invention include, for example, aliphatic polyisocyanates, alicyclic polyisocyanates, aromatic polyisocyanates or heterocyclic polyisocyanates which are well-known to the public in polyurethane or polyurea industrial field. More specifically, suitable organic polyisocyanates include, for example, 1,6-hexamethylene diisocyanate, cyclohexane-1,4-diisocyanate, 1,4-xylylene diisocyanate, 2,4-toluene diisocyanate, 2,6-toluene diisocyanate, 4,4'-diphenylmethane diisocyanate ("MDI"), 2,4-diphenylmethane diisocyanate, Polymeric MDI and modified polyisocyanates having a group such as urethane group, urea group, biuret group, carbodiimide group or isocyanurate group, and the mixture thereof. Among the polyisocyanates, preferable polyisocyanates are aromatic polyisocyanates such as MDI, Polymeric MDI, modified polyisocyanates thereof and the mixture thereof.

Suitable poly(oxytetramethylene)glycol ("PTMG") is a linear polyetherpolyol having a primary hydroxy group in both its terminals and has an weight ayerage molecular weight of 300 to 3,000. The preferable molecular weight of PTMG to be employed in the preparation of the PTMG-based prepolymer of the present invention is from 500 to 2,400.

The PTMG-based prepolymer is prepared reacting PTMG with an excess amount of an organic polyisocyanate in the range of temperature of 40 to 100° C. The NCO content of the prepolymer is from 14 to 28 wt % and the PTMG content of the prepolymer is from 10 to 50 wt %, preferably, 20 to 45 wt %.

One of the polyisocyanates useful in the present invention is a mixture of the stated PTMG-based prepolymer and a Polymeric MDI. The Polymeric MDI content of the isocyanate mixture is from 1 to 40 wt %, preferably, 2 to 30 wt %, more preferably, 5 to 20 wt %. The another polyisocyanate useful in the present invention is a prepolymer prepared from the reaction of an organic polyisocyanate containing a Polymeric MDI as an essential component with PTMG. The NCO content of the prepolymer is from 14 to 28 wt % and the PTMG content of the prepolymer is from 10 to 50 wt %, preferably, 20 to 45 wt %. The Polymeric MDI content in the prepolymer is from 1 to 40 wt %, preferably, 2 to 30 wt %, more preferably, 5 to 20 wt %.

Suitable polyols useful in the present invention include, for example, polyetherpolyols prepared from the reaction of alkyleneoxides such as ethyleneoxide, propyleneoxide and butyleneoxide with low molecular weight polyols such as ethyleneglycol, propyleneglycol, glycerol, trimethylolpropane, triethanolamine, pentaerythritol, sorbitol and sucrose, or polyamines such as ethylenediamine, xylylenediamine, piperazine and N-N-dimethylamino alkylamine, polymer polyols prepared from the reaction of the stated polyetherpolyols with ethylenic unsaturated monomers such as acrylonitrile, styrene, butadiene, methyl methacrylate, acrylic amide and vinyl acetate, or polyesters prepared from the reaction of the stated low molecular weight polyols with polycarboxylic acids such as succinic acid, maleic acid, sebacic acid, adipic acid, fumaric acid, phthalic acid and dimeric acid.

The inventors discovered that a polymer polyol is recommended to use as a polyol in order to improve abrasion resistance of polyurethane foam moldings of the present invention. Suitable polymer polyols include, for example, polymer polyols prepared from the reaction of a polyetherpolyol with acrylonitrile only or a mixture of acrylonitrile and other ethylenic unsaturated monomer such as styrene. However, though the use of such polymer polyols is of good advantage to improvement of abrasion resistance of polyurethane foam moldings, the amount of the polymer polyol employed should be determined with consideration of other properties such as processability since the polymer polyols have generally high viscosity. The amount of the polymer polyol employed in the total polyol is from 25 to 80 wt %, preferably, 30 to 70 wt %, more preferably, 35 to 60 wt %.

Suitable blowing agents useful in the present invention include, for example, water, chlorofluorocarbon ("CFC") or a mixture thereof. The suitable blowing agent is water alone or a blowing agent containing water as primary component. The amount of water employed is from 0.05 to 5 parts by weight ("pbw") based on the total polyol, preferably, 0.1 to 3 pbw, more preferably, 0.3 to 2 pbw. Solvents, having a low boiling point, such as pentane, methylenechloride, dichloromethane and 4,4'-diaminodiphenylmethane, can optionally be employed as a blowing agent together with water.

Suitable cross-linking agents to be optionally employed in the present invention include, for example, amine-based low molecular weight polyols such as triethanolamine and diethanolamine, and low molecular weight polyols such as ethyleneglycol, diethyleneglycol, butanediol, trimethylolpropane and glycerol, or a mixture thereof. The amount of the cross-linking agent employed is usually from 2 to 20 pbw based on the total polyol, preferably, 3 to 10 pbw.

Suitable urethane catalysts to be optionally employed in the present invention include, for example, organotin compounds such as dibutyltin dilaurate, dibutyltin diacetate, dihexyltin diacetate, di-2-ethylhexyltin oxide, stannous octoate and stannous oleate, and tertiary amine compounds such as trialkylamines like trimethylamine and triethylamine, heterocyclic amines like N-alkylmorpholine, ethers like 2,2'-bis (dimethylamino)diethylether, aliphatic polyamines like 1,4-dimethylpiperazine, triethylenediamine, N,N,N',N'-tetramethyl- 1,3-butanediamine and N-methyldiethanolamine, or a mixture thereof. The amount of the catalyst employed is usually less than 10 pbw based on the total polyol.

In addition to the stated components, other additives such as emulsifying agent, stabilizing agent, surfactant, filler, pigment and antioxidant can optionally be employed in the present invention. Polyurethane foam moldings of the present invention can be manufactured in accordance with known methods such as open-mold process or closed-mold process.

EXAMPLES

The present invention is described more specifically in the following Examples and Comparative Examples. It is to be understood, however, that the invention is not to be limited by the embodiments described in the following Examples. Reactive components employed in Examples and Comparative Examples are as follows. The term "pbw" or "%" is on the basis of weight unless otherwise specified.

(1) Polyisocyanates

Three polyisocyanates, diphenylmethane diisocyanate ("MDI") (I-125*; NCO content:33.6 wt %), a modified MDI (I-143L*; NCO content:29.4 wt %) and Polymeric MDI (PAPI-135*; NCO content:31.0 wt %) were selected as organic polyisocyanate component. (* Trademark of The Dow Chemical Company) Three PTMGs having different average molecular weight of 700, 1,000 and 1,500 (respectively "PTMG700", "PTMG1000" and "PTMG1500") were selected as polyol component. In addition, a polyetherpolyol having an average equivalent weight of 1,600 and capped ethyleneoxide (EO) content of 14 wt % ("Polyol Pi"), prepared from the reaction of glycerol as an initiator with propyleneoxide (PO), was selected as another polyol component. Various NCO-terminated prepolymers were prepared employing the stated polyisocyanate components and polyol components. The composition of each prepolymer and polyisocyanate mixture is shown in Table 1, Table 2 and Table 3.

(2) Polyols

Polyol P2: A propyleneoxide polyetherpolyol initiated with glycerol (Functionality:3, Average equivalent weight ("EW"):1,600, PO content:83 wt %, Capped EO content:17 wt %) This polyetherpolyol was prepared capping EO after the reaction of glycerol as an initiator with PO in the presence of potassium hydroxide as a catalyst.

Polyol CPPi: A polymer polyol (Functionality:3, OH value:28, solid content: 20 wt %) This polymer polyol was prepared polymerising the stated Polyol P2 with acrylonitrile.

Polyol CPP2: A polymer polyol (Functionality:3, OH value:28, solid content:20 wt %) This polymer polyol was prepared polymerising the stated Polyol P2 with a monomer mixture of acrylonitrile/styrene (70/30 weight ratio).

(3) Additives

Catalyst: Amine-based catalyst 1: Triethylenediamine in dipropyleneglycol 33 % solution (Dabco 33LV: Air Products)

Amine-based catalyst 2: Bis(dimethylaminoethyl) ether (NIAX A-1: Union Carbide)

Cross-linking agent: monoethyleneglycol (MEG)

Blowing agent: Water and Trichlorofluoromethane (CFC-11)

EXAMPLES 1 TO 29 AND COMPARATIVE EXAMPLES 1 TO 2

According to the formulations shown in Table 4, 5, 6, 7 and 8, various polyurethane foam moldings (steering wheels) were prepared based in the following manner.

A polyol and other additives except a polyisocyanate were mixed for 10 seconds at 3,000 r.p.m. Next, the measured polyisocyanate was mixed with the polyol mixture for 3 seconds at 3,000 r.p.m. and continually the mixture was injected into an iron mold being maintained under 45° C. After 2 minute cure, a polyurethane foam was demolded from the mold. Some samples for abrasion test were prepared from the foam obtained. The results of abrasion tests are shown in each Table. The demolding time from the mold of each foam was within the range of 1.5 to 2 minutes and there was no problem in processability. On the other hand, the demolding time of Comparative Example 1 and 2 were 2.5 minutes and 3 minutes respectively.

Evaluation of Abrasion Resistance: Testing samples having outer peripheral length of about 80 mm were cut and prepared from a foam moldings (steering wheel) obtained as stated above. The foam molding was prepared covering an iron pipe (outside diameter: 14 mm) with polyurethane foam (shape of a cross section to the diameter-direction: ellipse having a 28 mm long diameter and a 23 mm short diameter). The abrasion resistance of the testing sample was evaluated using a testing machine for abrasion resistance, "SUGA FR-2-S Type" (produced by Suga Test Instruments in Japan). The testing sample was set in the machine as the outer surface of the sample contacted a white cloth (Canvas Cloth No.10) having a 100 g weighting in its one end. The surface of the sample was rubbed against the cloth for certain times ($3 \times 10^4$, $5 \times 10^4$ and $10 \times 10^4$ times) under the stated conditions. The abrasion test was evaluated by visual observation and the ranking of 1 to 5 was given to each result. The meaning of each rank shown as "5", "4" and "3" in each Table is as follows.

5: no abrasion (no change)

4: slight abrasion with polish

3: more abrasion

As evident from results shown in each Table, all Invention Examples show better abrasion properties than Comparative Example 2 wherein a conventional prepolymer, without use of PTMG and Polymeric-MDI, is employed as an organic polyisocyanate. Also, they show about the same or better properties than Comparative Example 1 wherein a conventional formulation, using now restricted CFC as the sole blowing agent, is employed. Naturally, elimination of as much CFC as possible is now sought.

TABLE 1

| | Polyisocyanates (Examples) | | | | | | |
|---|---|---|---|---|---|---|---|
| | I | II | III | IV | V | VI | VII |
| (Prepolymer) | | | | | | | |
| Isocyanate | | | | | | | |
| I-125 | 48 | 48 | 48 | 53 | 38 | 28 | 48 |
| I-143L | 16 | 16 | 16 | 18 | 14 | 12 | 16 |
| PAPI-135 | — | — | — | — | — | — | 5 |
| Polyol | | | | | | | |
| PTMG700 | 26 | — | — | — | — | — | — |
| PTMG1000 | — | 26 | — | 24 | 28 | 30 | 26 |
| PTMG1500 | — | — | 26 | — | — | — | — |
| (Polyisocyanate) | | | | | | | |
| PAPI-135 | 10 | 10 | 10 | 5 | 20 | 30 | 5 |
| Total NCO % of the mixture | 20.6 | 21.5 | 22.4 | 22.5 | 20.6 | 19.8 | 20.5 |

TABLE 2

| | Polyisocyanates (Examples) | | | | | |
|---|---|---|---|---|---|---|
| | VIII | IX | X | XI | XII | XIII |
| (Prepolymer) | | | | | | |
| Isocyanate | | | | | | |
| I-125 | 53 | 48 | 48 | 48 | 38 | 28 |
| I-143L | 18 | 16 | 16 | 16 | 14 | 12 |

TABLE 2-continued

| | Polyisocyanates (Examples) | | | | | |
|---|---|---|---|---|---|---|
| | VIII | IX | X | XI | XII | XIII |
| PAPI-135 | 5 | 10 | 10 | 10 | 20 | 30 |
| Polyol | | | | | | |
| PTMG700 | — | 26 | — | — | — | — |
| PTMG1000 | 24 | — | 26 | — | 28 | 30 |
| PTMG1500 | — | — | — | 26 | — | — |
| Total NCO % of the Prepolymer | 22.5 | 20.6 | 21.5 | 22.4 | 20.6 | 19.8 |

TABLE 3

| | Polyisocyanates (Comparative Examples) | |
|---|---|---|
| | XIV | XV |
| (Prepolymer) | | |
| Isocyanate | | |
| I-125 | — | 50 |
| I-143L | 86 | 15 |
| Polyol | | |
| Polyol P1 | 14 | 35 |
| Total NCO % of the Prepolymer | 24.5 | 20.2 |

TABLE 4

FORMULATIONS AND ABRASION PROPERTY (EXAMPLES 1 TO 7)

| No. | 1 | 2 | 3 | 4 | 5 | 6 | 7 |
|---|---|---|---|---|---|---|---|
| Polyisocyanate I | 100 | — | — | — | — | — | — |
| Polyisocyanate II | — | 100 | — | — | — | — | — |
| Polyisocyanate III | — | — | 100 | — | — | — | — |
| Polyisocyanate IV | — | — | — | 100 | — | — | — |
| Polyisocyanate V | — | — | — | — | 100 | — | — |
| Polyisocyanate VI | — | — | — | — | — | 100 | — |
| Polyisocyanate VII | — | — | — | — | — | — | 100 |
| Polyol P2 | 60 | 60 | 60 | 60 | 60 | 60 | 60 |
| Polyol CPP1 | 40 | 40 | 40 | 40 | 40 | 40 | 40 |
| MEG | 7 | 7 | 7 | 7 | 7 | 7 | 7 |
| Dabco 33LV | 1.5 | 1.5 | 1.5 | 1.5 | 1.5 | 1.5 | 1.5 |
| NIAX A-1 | 0.3 | 0.3 | 0.3 | 0.3 | 0.3 | 0.3 | 0.3 |
| Water | 0.5 | 0.5 | 0.5 | 0.5 | 0.5 | 0.5 | 0.5 |
| (Abrasion Resistance) | | | | | | | |
| at $3 \times 10^4$ times | 5 | 5 | 5 | 5 | 5 | 5 | 5 |
| at $5 \times 10^4$ times | 5 | 5 | 5 | 5 | 5 | 5 | 5 |
| at $10 \times 10^4$ times | 4.5 | 4.5 | 4.5 | 4.5 | 4.5 | 4.5 | 4.5 |

(Note) Amount employed: pbw (Polyisocyanate: NCO Index)

TABLE 5

FORMULATIONS AND ABRASION PROPERTY (EXAMPLES 8 TO 15)

| No. | 8 | 9 | 10 | 11 | 12 | 13 | 14 | 15 |
|---|---|---|---|---|---|---|---|---|
| Polyisocyanate II | 100 | 100 | 100 | 100 | 100 | 100 | 100 | 100 |
| Polyol P2 | 30 | 50 | 70 | 100 | 60 | 60 | 60 | 60 |
| Polyol CPP1 | 70 | 50 | 30 | — | 40 | 40 | 40 | — |
| Polyol CPP2 | — | — | — | — | — | — | — | 40 |
| MEG | 7 | 7 | 7 | 7 | 7 | 7 | 7 | 7 |
| Dabco 33LV | 1.5 | 1.5 | 1.5 | 1.5 | 1.5 | 1.5 | 1.5 | 1.5 |
| NIAX A-1 | 0.3 | 0.3 | 0.3 | 0.3 | 0.3 | 0.3 | 0.3 | 0.3 |

TABLE 5-continued

FORMULATIONS AND ABRASION PROPERTY (EXAMPLES 8 TO 15)

| No. | 8 | 9 | 10 | 11 | 12 | 13 | 14 | 15 |
|---|---|---|---|---|---|---|---|---|
| Water | 0.5 | 0.5 | 0.5 | 0.5 | 0.3 | 0.8 | 0.2 | 0.5 |
| CFC-11 | — | — | — | — | — | — | 5 | — |
| (Abrasion Resistance) | | | | | | | | |
| at $3 \times 10^4$ times | 5 | 5 | 5 | 4.5 | 5 | 5 | 5 | 5 |
| at $5 \times 10^4$ times | 5 | 5 | 5 | 4 | 5 | 5 | 5 | 5 |
| at $10 \times 10^4$ times | 4.5 | 4.5 | 4.5 | 3.5 | 4.5 | 4.5 | 4.5 | 4.5 |

(Note) Amount employed: pbw (Polyisocyanate: NCO Index)

TABLE 6

FORMULATIONS AND ABRASION PROPERTY (EXAMPLES 16 TO 21)

| No. | 16 | 17 | 18 | 19 | 20 | 21 |
|---|---|---|---|---|---|---|
| Polyisocyanate VIII | 100 | — | — | — | — | — |
| Polyisocyanate IX | — | 100 | — | — | — | — |
| Polyisocyanate X | — | — | 100 | — | — | — |
| Polyisocyanate XI | — | — | — | 100 | — | — |
| Polyisocyanate XII | — | — | — | — | 100 | — |
| Polyisocyanate XIII | — | — | — | — | — | 100 |
| Polyol P2 | 60 | 60 | 60 | 60 | 60 | 60 |
| Polyol CPP1 | 40 | 40 | 40 | 40 | 40 | 40 |
| MEG | 7 | 7 | 7 | 7 | 7 | 7 |
| Dabco 33LV | 1.5 | 1.5 | 1.5 | 1.5 | 1.5 | 1.5 |
| NIAX A-1 | 0.3 | 0.3 | 0.3 | 0.3 | 0.3 | 0.3 |
| Water | 0.5 | 0.5 | 0.5 | 0.5 | 0.5 | 0.5 |
| (Abrasion Resistance) | | | | | | |
| at $3 \times 10^4$ times | 5 | 5 | 5 | 5 | 5 | 5 |
| at $5 \times 10^4$ times | 5 | 5 | 5 | 5 | 5 | 5 |
| at $10 \times 10^4$ times | 4.5 | 4.5 | 4.5 | 4.5 | 4.5 | 4.5 |

(Note) Amount employed: pbw (Polyisocyanate: NCO Index)

TABLE 7

FORMULATIONS AND ABRASION PROPERTY (EXAMPLES 22 TO 29)

| No. | 22 | 23 | 24 | 25 | 26 | 27 | 28 | 29 |
|---|---|---|---|---|---|---|---|---|
| Polyisocyanate X | 100 | 100 | 100 | 100 | 100 | 100 | 100 | 100 |
| Polyol P2 | 30 | 50 | 70 | 100 | 60 | 60 | 60 | 60 |
| Polyol CPP1 | 70 | 50 | 30 | — | 40 | 40 | 40 | — |
| Polyol CPP2 | — | — | — | — | — | — | — | 40 |
| MEG | 7 | 7 | 7 | 7 | 7 | 7 | 7 | 7 |
| Dabco 33LV | 1.5 | 1.5 | 1.5 | 1.5 | 1.5 | 1.5 | 1.5 | 1.5 |
| NIAX A-1 | 0.3 | 0.3 | 0.3 | 0.3 | 0.3 | 0.3 | 0.3 | 0.3 |
| Water | 0.5 | 0.5 | 0.5 | 0.5 | 0.3 | 0.8 | 0.2 | 0.5 |
| CFC-11 | — | — | — | — | — | — | 5 | — |
| (Abrasion Resistance) | | | | | | | | |
| at $3 \times 10^4$ times | 5 | 5 | 5 | 4.5 | 5 | 5 | 5 | 5 |
| at $5 \times 10^4$ times | 5 | 5 | 5 | 4 | 5 | 5 | 5 | 5 |
| at $10 \times 10^4$ times | 4.5 | 4.5 | 4.5 | 3.5 | 4.5 | 4.5 | 4.5 | 4.5 |

(Note) Amount employed: pbw (Polyisocyanate: NCO Index)

TABLE 8

FORMULATIONS AND ABRASION PROPERTY (COMPARATIVE EXAMPLES 1 TO 2)

| No. | 1 | 2 |
|---|---|---|
| Polyisocyanate XIV | 100 | — |
| Polyisocyanate XV | — | 100 |
| Polyol P2 | 100 | 100 |
| MEG | 7 | 7 |
| Dabco 33LV | 1.5 | 1.5 |
| NIAX A-1 | 0.3 | 0.3 |
| Water | — | 0.5 |
| CFC-11 | 15 | — |
| (Abrasion Resistance) | | |
| at $3 \times 10^4$ times | 5 | 3.5 |
| at $5 \times 10^4$ times | 5 | 3 |
| at $10 \times 10^4$ times | 4.5 | — |

(Note) Amount employed: pbw (Polyisocyanate: NCO Index)

What is claimed is:

1. Polyurethane foam moldings prepared by reacting a polyisocyanate with a polyol in the presence of water as a blowing agent, wherein (a) the polyisocyanate comprises a mixture of (i) from 5–30 weight percent polymethylene polyphenyl polyisocyanate and (ii) an NCO-terminated prepolymer having an NCO content of from 14–28 weight percent prepared from the reaction of an organic polyisocyanate with 20 to 45 weight percent of a poly(oxytetramethylene)glycol which is a linear polyetherpolyol having a primary hydroxy group in both its terminals and a weight average molecular weight of from 300–3000, said weight percents being based on the total weight of organic polyisocyanate, poly(oxytetramethylene)glycol, and polymethylene polyphenyl polyisocyanate, and (b) the polyol contains at least 30 weight percent polymer polyol prepared from the reaction of a polyetherpolyol with an ethylenically unsaturated monomer.

2. Polyurethane foam moldings prepared by reacting a polyisocyanate with a polyol in the presence of water as a blowing agent, wherein (a) the polyisocyanate comprises an NCO-terminated prepolymer having an NCO content of from 14–28 weight percent prepared from the reaction of (i) an organic polyisocyanate, (ii) from 5–30 weight percent polymethylene polyphenyl polyisocyanate and (iii) from 20 to 45 weight percent of a poly(oxytetramethylene)glycol which is a linear polyetherpolyol having a primary hydroxy group in both its terminals and a weight average molecular weight of from 300–3000, said weight percents being based on the total weight of organic polyisocyanate, poly(oxytetramethylene)glycol, and polymethylene polyphenyl polyisocyanate, and (b) the polyol contains at least 30 weight percent polymer polyol prepared from the reaction of a polyetherpolyol with an ethylenically unsaturated monomer.

3. The polyurethane foam moldings of claim 1 wherein the organic polyisocyanate is 4,4'-diphenylmethane diisocyanate or a modified 4,4'-diphenylmethane diisocyanate.

4. The polyurethane foam moldings of claim 1 wherein the weight average molecular weight of the poly(oxytetramethylene)glycol is from about 500 to about 2,400 and the polyol contains from about 30 to about 70 weight percent polymer polyol based on the total weight of polyol component (b).

5. The polyurethane foam moldings of claim 1 wherein the ethylenic unsaturated monomer is acrylonitrile.

6. The polyurethane foam moldings of claim 1 wherein the water content is from about 0.3 to about 2 parts by weight based on the total weight of the polyol component (b).

7. The polyurethane foam moldings of claim 2 wherein the organic polyisocyanate is 4,4'-diphenylmethane diisocyanate or a modified 4,4'-diphenylmethane diisocyanate and the polymethylene polyphenyl polyisocyanate is employed in about 5 to about 20 weight percent based on the total weight of the polyisocyanate, polymethylene polyphenyl polyisocyanate, and poly(oxytetramethylene)glycol NCO-terminated.

8. The polyurethane foam moldings of claim 2 wherein the weight average molecular weight of the poly(oxytetramethylene)glycol is from 500 to 2,400 and the polyol contains from about 30 to about 70 weight percent polymer polyol based on the total weight of the polyol component (b).

9. The polyurethane foam moldings of claim 2 wherein the ethylenic unsaturated monomer is acrylonitrile.

10. The polyurethane foam moldings of claim 2 wherein the water content is from about 0.3 to about 2 parts by weight based on the total polyol component (b).

* * * * *